United States Patent
Segev et al.

(10) Patent No.: US 11,089,497 B2
(45) Date of Patent: Aug. 10, 2021

(54) APPARATUS, SYSTEM AND METHOD OF WIRELESS PASSIVE SCANNING

(71) Applicant: INTEL CORPORATION, Santa Clara, CA (US)

(72) Inventors: Eran Segev, Tel Aviv (IL); Ehud Reshef, Qiryat Tivon (IL); Hagay Barel, Kiriat Bialik (IL); Ido Ouzieli, Tel Aviv (IL); Nir Balaban, Kfar Netter (IL)

(73) Assignee: INTEL CORPORATION, Santa Clara, CA (US)

( * ) Notice: Subject to any disclaimer, the term of this patent is extended or adjusted under 35 U.S.C. 154(b) by 41 days.

(21) Appl. No.: 16/727,211

(22) Filed: Dec. 26, 2019

(65) Prior Publication Data

US 2020/0137597 A1   Apr. 30, 2020

(51) Int. Cl.
| | |
|---|---|
| *H04W 74/00* | (2009.01) |
| *H04W 24/08* | (2009.01) |
| *H04W 48/12* | (2009.01) |
| *H04W 84/12* | (2009.01) |

(52) U.S. Cl.
CPC .......... *H04W 24/08* (2013.01); *H04W 48/12* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 10,321,483 | B1 * | 6/2019 | Moon | H04W 74/0808 |
| 2017/0034838 | A1 * | 2/2017 | Trainin | H04W 74/0808 |

OTHER PUBLICATIONS

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

* cited by examiner

*Primary Examiner* — Ayanah S George
(74) *Attorney, Agent, or Firm* — Shichrur & Co.

(57) ABSTRACT

For example, a wireless communication device may be configured to, in a passive scan of a plurality of wireless communication channels, perform an energy detection over the plurality of wireless communication channels during an energy detection period, the energy detection configured to identify for a wireless communication channel of the plurality of wireless communication channels whether or not energy is detected over the wireless communication channel; and based on detection of energy over a first wireless communication channel of the plurality of wireless communication channels during the energy detection period, perform a wireless packet detection over the first wireless communication channel to detect a wireless packet transmission, the wireless packet detection to be performed while continuing the energy detection over one or more second wireless communication channels of the plurality of wireless communication channels to detect energy over the one or more second wireless communication channels.

25 Claims, 5 Drawing Sheets

APPARATUS, SYSTEM AND METHOD OF WIRELESS PASSIVE SCANNING

TECHNICAL FIELD

Embodiments described herein generally relate to wireless passive scanning.

BACKGROUND

A wireless communication device may perform a scan procedure, for example, a passive scan procedure or an active scan procedure, for example, to determine and/or map an existence of nearby Access Points (APs).

The wireless communication device may consider the nearby APs as candidates, for example, to establish a wireless communication link.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
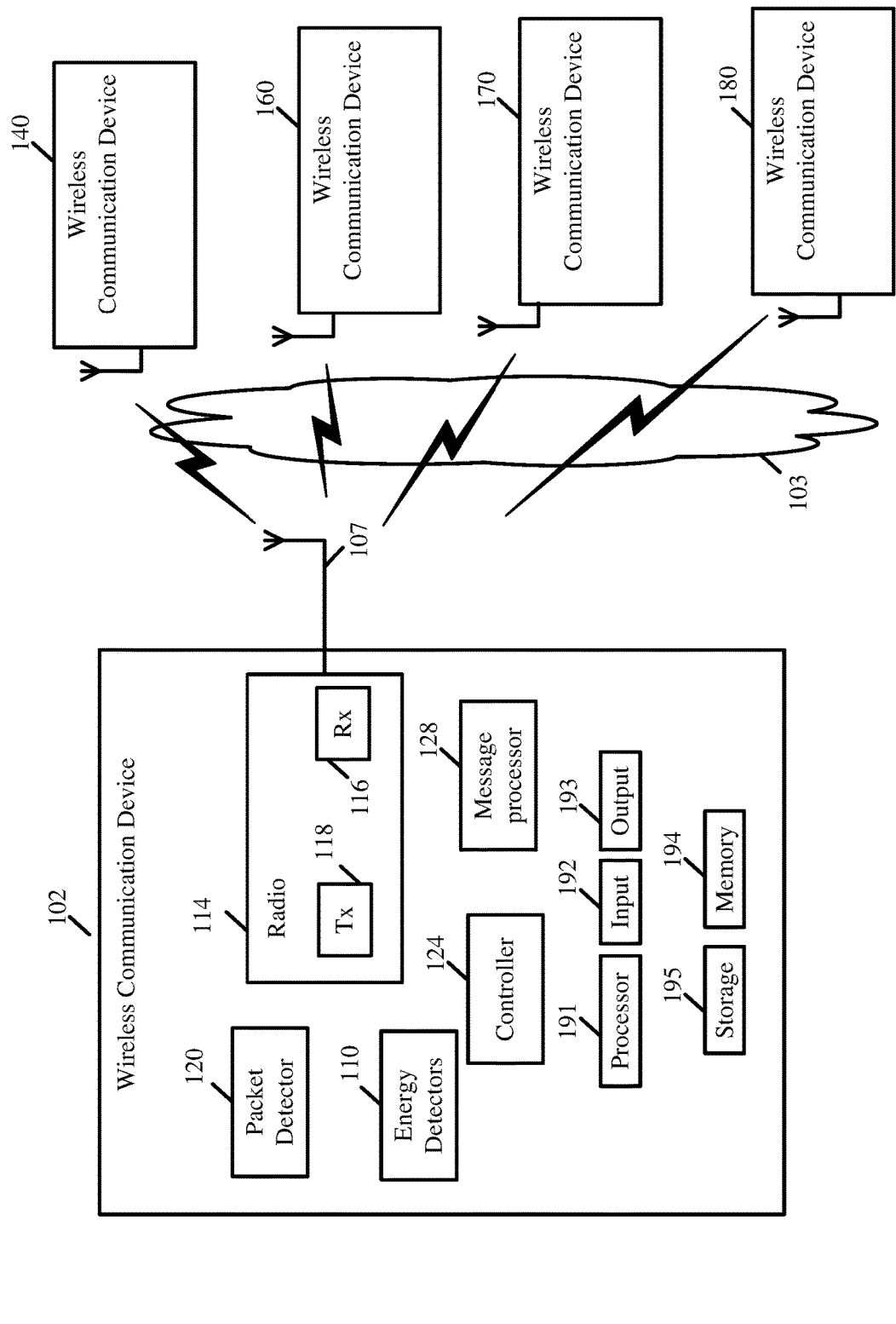
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks— Specific requirements Part* 11: *Wireless LAN Medium Access Control (MAC) and Physical Layer (PHY) Specifications*, Dec. 7, 2016); and/or future versions and/or derivatives thereof, devices and/or networks operating in accordance with existing WFA Peer-to-Peer (P2P) specifications (including *Wi-Fi P2P technical specification, version* 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a Wi-Fi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a Wi-Fi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to Wi-Fi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160, 170 and/or 180.

In some demonstrative embodiments, wireless communication devices 102, 140, 160, 170 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160, 170 and/or 180 may include, operate as, and/or perform the functionality of one or more STAs. For example, devices 102, 140, 160, 170 and/or 180 may include at least one STA.

In some demonstrative embodiments, devices 102, 140, 160, 170 and/or 180 may include, operate as, and/or perform the functionality of one or more WLAN STAs.

In some demonstrative embodiments, devices 102, 140, 160, 170 and/or 180 may include, operate as, and/or perform the functionality of one or more Wi-Fi STAs.

In some demonstrative embodiments, devices 102, 140, 160, 170 and/or 180 may include, operate as, and/or perform the functionality of one or more BT devices.

In some demonstrative embodiments, devices 102, 140, 160, 170 and/or 180 may include, operate as, and/or perform the functionality of one or more Neighbor Awareness Networking (NAN) STAs.

In some demonstrative embodiments, one or more of wireless communication devices 102, 140, 160, 170 and/or 180, e.g., devices 140, 160, 170 and/or 180, may include, operate as, and/or perform the functionality of an Access Point (AP) STA.

In some demonstrative embodiments, one or more of wireless communication devices 102, 140, 160, 170 and/or 180, e.g., device 102, may include, operate as, and/or perform the functionality of a non-AP STA.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of one or more of device 102 may be enclosed in a common housing or packaging, and may be interconnected or operably associated using one or more wired or wireless links. In other embodiments, components of one or more of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication devices 102, 140, 160, 170 and/or 180 may be capable of communicating content, data, information and/or signals via a wireless medium (WM) 103. In some demonstrative embodiments, wireless medium 103 may include, for example, a radio channel, a Wi-Fi channel, a cellular channel, a Global Navigation Satellite System (GNSS) Channel, an RF channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a 6 GHz frequency band, a millimeterWave (mmWave) frequency band, e.g., a 60 GHz frequency band, a Sub-1 GHz (S1G) band, and/or any other frequency band.

In some demonstrative embodiments, devices 102, 140, 160, 170 and/or 180 may include one or more radios including circuitry and/or logic to perform wireless communication between devices 102, 140, 160, 170 and/or 180, and/or one or more other wireless communication devices. For example, device 102 may include a radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 may include or may be implemented as part of a wireless Network Interface Card (NIC), and the like.

In some demonstrative embodiments, radio 114 may be configured to communicate over a 2.4 GHz band, a 5 GHz band, an mmWave band, a S1G band, and/or any other band.

In some demonstrative embodiments, radio 114 may include, or may be associated with, one or more antennas 107.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a multiple element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180, and/or one or more other devices, e.g., as described below.

In some demonstrative embodiments, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124, respectively. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114.

In other embodiments, the functionality of controller 124 may be implemented as part of any other element of device 102.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative embodiments, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, wireless communication devices 102, 140, 160, 170 and/or 180 may form, or may communicate as part of, a wireless local area network (WLAN).

In some demonstrative embodiments, wireless communication devices 102, 140, 160, 170 and/or 180 may form, or may communicate as part of, a Wi-Fi network.

In other embodiments, wireless communication devices 102, 140, 160, 170 and/or 180 may form, and/or communicate as part of, any other additional or alternative network.

In some demonstrative embodiments, devices 102 may include, operate as, perform the role of, and/or perform one or more functionalities of, one or more STAs.

In some demonstrative embodiments, devices 140, 160, 170 and/or 180 may include, operate as, perform the role of, and/or perform one or more functionalities of an AP STA.

In some demonstrative embodiments, device 102 may be configured to perform a wireless scan, for example, a passive or an active AP scan, for example, to identify and/or map existence of one or more APs, for example, one or more APs located nearby to device 102, e.g., devices 140, 160, 170 and/or 180.

In one example, device 102 may perform the wireless scan, for example, to detect one or more APs, e.g., devices 140, 160, 170 and/or 180, to be candidates for establishing a wireless communication link.

In some demonstrative embodiments, the wireless scan may be repeated more often, for example, if a number of usages and/or a number of potential WiFi networks increases.

In some demonstrative embodiments, it may be advantageous to reduce a duration of a wireless scan procedure, for example, in order to reduce a power consumption and/or to improve a user experience, e.g., as described below.

In one example, reducing the scan time may have a significant impact on user experience. For example, due to the generally unmanaged nature of Wi-Fi networks, a STA may be obliged to periodically scan a spectrum for APs and/or Wi-Fi Networks during a scan time, which may be long, e.g., more than two seconds, and during which the station may not be able to communicate with its serving AP.

In some demonstrative embodiments, a STA, e.g., device 102, may be configured to perform an active scan, for example, to identify and/or map the existence of one or more APs, for example, one or more APs located nearby device 102, e.g., devices 140, 160, 170 and/or 180.

In one example, a STA may be allowed to initiate transmissions, for example, during the active scan, in which the STA may send a Probe Request message, which solicits answers from any AP on the channel. However, implementation of the active scan scheme over one or more regulatory channels, e.g., 12 channels in the 5 GHz band and/or one or more other channels in the 6-7 GHz band, may be prohibited by regulatory authorities. For example, transmissions in the regulatory channels may only be allowed, for example, in case there are no incumbent services in the channel in a location of the STA. For example, transmissions in the regulatory channels may only be allowed if there are no radars, e.g., in the 5 GHz band, a Fixed Wireless Access (FWA), a Broadcast, incumbents in the 6-7 GHz band and/or any other incumbent services in the location of the STA.

In some demonstrative embodiments, a STA, e.g., device 102, may be configured to perform a passive scan, e.g., to detect a beacon and/or any other type of frame, for example, over one or more regulatory channels and/or any other channels, for example, to identify and/or map the existence of one or more APs, for example, one or more APs located nearby device 102, e.g., devices 140, 160, 170 and/or 180.

In some demonstrative embodiments, there may be a need to address one or more inefficiencies, disadvantages and/or technical problems in one or more use cases and/or scenarios, for example, when a STA implements a passive scan, for example, over the regulatory channels.

In one example, the passive scan may include a channel passive scan over each of the regulatory channels. For example, during the passive channel scan the STA may listen for the existence of a valid Wi-Fi transmission over a regulatory channel during a channel dwell time. For example, an AP may transmit beacons every predefined time period, e.g., about every 100 milliseconds (ms). Accordingly, the channel dwell time may be about 100 ms, for example, assuming a single packet detector implementation. According to this example, an overall duration of the passive scan may be very long, for example, if a STA is required to sequentially perform the channel passive scan over all of the regulatory channels, e.g., to listen over each of the regulatory channels for about 100 ms.

In some demonstrative embodiments, an energy detection, e.g., an energy detection procedure, e.g., an Energy Based Scan (EBS) procedure, may be configured to detect energy over a plurality of channels, e.g., 8 adjacent channels or any other number of channels, for example, to detect one or more channels to perform a passive scan, for example, to improve a scan time of the passive scan.

In some demonstrative embodiments, in some use cases and/or scenarios, it may be disadvantageous and/or inefficient to cause a STA to perform a wireless scan operation by sequentially performing a channel passive scan on each of the regulatory channels over which energy had been detected during the energy detection.

In one example, in a dense Wi-Fi environment and/or a real life environment with many RF sources, there may be many channels having energy detected over them, e.g., during the energy detection. Therefore, performing a channel passive scan on each of these regulatory channels, e.g., during a channel dwell time of about 100 ms, may result in an increased scan time of the passive scan, a decreased throughput, an increased latency, e.g., since the STA cannot receive or transmit data packets during the passive scan, and/or an increased power consumption, e.g., a long wake up time in an active receive state instead of being in a low power state.

In some demonstrative embodiments, in some use cases and/or scenarios, it may be disadvantageous and/or inefficient to implement multiple receivers with multiple hardware packet detectors, for example, to reduce a scan time of a wireless scan operation, for example, as this implementation may not be cost effective.

In some demonstrative embodiments, a STA, e.g., device 102 may be configured to implement a passive scanning scheme, which may be configured to significantly reduce a scan time of a wireless scan operation, e.g., as described below.

In some demonstrative embodiments, device 102 may be configured to implement one or more capabilities, for example, to reduce the scan time of the passive scan, e.g., as described below.

In some demonstrative embodiments, device 102 may be configured to implement one or more capabilities, for example, to immediately tune a packet detector to a channel in which energy is detected during the energy detection, e.g., as described below.

In some demonstrative embodiments, device 102 may be configured to implement one or more capabilities, for example, to add time stamps to identify time instances at which energy was detected on a specific channel during the energy detection, e.g., as described below.

In some demonstrative embodiments, device 102 may be configured to implement one or more capabilities, for example, to tune the packet detector to a target channel at a specific time, for example, based on a time stamp for the energy detected over the target channel, e.g., as described below.

In some demonstrative embodiments, device 102 may be configured to initiate an energy detection over a plurality of channels, e.g., at least 8 adjacent channels and/or any other number of channels; and to tune the packet detector to a channel, e.g., based on energy detection in the channel, for example, once energy is detected in that channel.

In some demonstrative embodiments, device 102 may be configured, for example, to register an event that energy is detected on a channel, for example, in case the energy is detected while the packet detector is engaged on another channel, e.g., as described below.

In some demonstrative embodiments, device 102 may be configured, for example, to return to the same channel for which the event was registered, for example, at a next expected transmission time, e.g., 100 ms later, for example, assuming the detected energy corresponds to a periodic wireless transmission, for example, a beacon transmission, e.g., as described below.

In some demonstrative embodiments, configuring device 102 according to the scan procedure described herein may allow to even use a single packet detector, e.g., to support scanning on N channels simultaneously, and, accordingly, may avoid a need to implement N duplicates of a packet detector, and/or may reduce the passive scan time of the passive scan, for example, by approximately a factor of N.

In some demonstrative embodiments, device 102 may be configured to implement more than one packet detector, for example, two or more packet detectors, e.g., to support scanning on the N channels simultaneously. This implementation may even further reduce the passive scan time of the passive scan.

In some demonstrative embodiments, configuring device 102 according to the scan procedure described herein may allow to reduce the passive scan time, for example, by addressing drawbacks of a sequential passive scan scheme, e.g., the degradation in throughput, latency, and/or power consumption, for example, while not bloating a system with a plurality of duplicates of parallel packet detectors.

In some demonstrative embodiments, device 102 may be configured to perform a passive scan over a plurality of wireless communication channels, for example, to detect one or more APs, for example, devices 140, 160, 170 and/or 180, e.g., as described below.

In some demonstrative embodiments, controller 124 may be configured to control, cause and/or trigger the STA implemented by device 102 to, in a passive scan of a plurality of wireless communication channels, perform an energy detection over the plurality of wireless communication channels during an energy detection period, e.g., as described below.

In some demonstrative embodiments, the plurality of wireless communication channels may include at least eight 20 Megahertz (MHz) wireless communication channels, e.g., as describe below.

In other embodiments, the plurality of wireless communication channels may include any other number of wireless communication channels, e.g., less from or more than 8 channels, having any other bandwidth.

In some demonstrative embodiments, the energy detection period may be based, for example, on a channel dwell time, e.g., as described below.

In other embodiments, the energy detection period may be based, for example, on any other additional or alternative parameters.

In some demonstrative embodiments, the energy detection may be configured to identify for a wireless communication channel of the plurality of wireless communication channels whether or not energy is detected over the wireless communication channel, e.g., as described below.

In some demonstrative embodiments, controller 124 may be configured to control, cause and/or trigger the STA implemented by device 102 to, based on detection of energy over a first wireless communication channel of the plurality of wireless communication channels during the energy detection period, perform a wireless packet detection over the first wireless communication channel, for example, to detect a wireless packet transmission, e.g., as described below.

In some demonstrative embodiments, the wireless packet detection may be performed, for example, while continuing the energy detection over one or more second wireless communication channels of the plurality of wireless communication channels, for example, to detect energy over the one or more second wireless communication channels, e.g., as described below.

In some demonstrative embodiments, the wireless packet transmission may include a beacon frame, e.g., as described below.

In some demonstrative embodiments, the wireless packet transmission may include any other wireless packet transmission. For example, the wireless packet transmission may include any wireless transmission considered to be a wireless packet transmission, for example, a wireless packet with a correct Frame Check Sequence (FCS), which may be based on a structure of a WiFi frame.

In other embodiments, the wireless packet transmission may include any other wireless transmission, e.g., as described below.

In some demonstrative embodiments, device 102 may detect energy over a second wireless communication channel of the one or more second wireless communication channels, for example, during the energy detection period, e.g., as described below.

In some demonstrative embodiments, controller 124 may be configured to control, cause and/or trigger the STA implemented by device 102 to, based on detection of energy over a second wireless communication channel of the one or more second wireless communication channels during the energy detection period, perform a wireless packet detection over the second wireless communication channel to detect another wireless packet transmission, e.g., as described below.

In some demonstrative embodiments, the wireless packet detection over the second wireless communication channel may be performed, for example, while continuing the energy detection over one or more other wireless communication channels of the plurality of wireless communication channels, for example, to detect energy over the one or more other wireless communication channels, e.g., as described below.

In some demonstrative embodiments, the detection of energy over the second wireless communication channel may be, for example, after the wireless packet detection over the first wireless communication channel, e.g., as described below.

In some demonstrative embodiments, the detection of energy over the second wireless communication channel may be, for example, during the wireless packet detection over the first wireless communication channel, e.g., as described below.

In some demonstrative embodiments, controller 124 may be configured to control, cause and/or trigger the STA implemented by device 102 to, based on detection of energy over a second wireless communication channel of the one or more second wireless communication channels during the wireless packet detection over the first wireless communication channel, perform a wireless packet detection over the second wireless communication channel, for example, to detect another wireless packet transmission during a successive energy detection period after the energy detection period, e.g., as described below.

In some demonstrative embodiments, controller 124 may be configured to control, cause and/or trigger the STA implemented by device 102 to device to determine a time stamp corresponding to a time of detection of the energy over the second wireless communication channel, and to determine, for example, based on the time stamp, a timing of the wireless packet detection over the second wireless communication channel during the successive energy detection period, e.g., as described below.

In some demonstrative embodiments, device 102 may be configured to determine whether or not to perform the wireless packet detection over the first wireless communication channel, for example, based on the detection of the energy over the first wireless communication channel, e.g., as described below.

In some demonstrative embodiments, controller 124 may be configured to control, cause and/or trigger the STA implemented by device 102 to determine whether or not to perform the wireless packet detection over the first wireless communication channel, for example, based on at least one criterion, e.g., as described below.

In some demonstrative embodiments, the at least one criterion may be based, for example, on one or more attributes of the energy detected over the first wireless communication channel, e.g., as described below.

In some demonstrative embodiments, the at least one criterion may be based, for example, on a duration of the detection of the energy over the first wireless communication channel, e.g., as described below.

In other embodiments, the at least one criterion may be based, for example, on any other additional or alternative attribute of the energy detected over the first wireless communication channel.

In some demonstrative embodiments, controller 124 may be configured to control, cause and/or trigger the STA implemented by device 102 to determine whether or not to perform the wireless packet detection over the first wireless communication channel, for example, based on a duration of the detection of the energy over the first wireless communication channel, e.g., as described below.

In one example, device 102 may select not to perform the wireless packet detection over the first wireless communication channel, for example, when the energy detected over the first wireless communication channel is not considered to be energy of a wireless packet. For example, device 102 may select not to perform the wireless packet detection over the first wireless communication channel, for example, when the energy detected over the first wireless communication channel is identified as noise.

In some demonstrative embodiments, device 102 may include a plurality of energy detectors 110 configured to detect energy over a respective plurality of wireless communication channels, e.g., as described below.

In some demonstrative embodiments, controller 124 may be configured to control, cause and/or trigger the plurality of energy detectors 110 to detect the energy over the plurality of wireless communication channels, e.g., as described below.

In some demonstrative embodiments, controller 124 may be configured to control, cause and/or trigger an energy detector 110 of the plurality of energy detectors 110 to detect energy over a respective wireless communication channel of the plurality of wireless communication channels, e.g., as described below.

In some demonstrative embodiments, device 102 may include a wireless packet detector 120 configured to detect a wireless packet transmission over a wireless communication channel, e.g., as described below.

In some demonstrative embodiments, controller 124 may be configured to control, cause and/or trigger the wireless packet detector 120 to detect the wireless packet transmission over the first wireless communication channel, for example, during the energy detection over the plurality of wireless communication channels, e.g., as described below.

In some demonstrative embodiments, device 102 may include a single packet detector 120, e.g., as described below.

In other embodiments, device 102 may include more than one wireless packet detector 120. For example, device 102 may include two or more wireless packet detectors 120.

In one example, the two or more wireless packet detectors 120 may be configured, for example, to detect two or more wireless packet transmissions over two or more respective wireless communication channels, e.g., simultaneously, for example, during the energy detection over the plurality of wireless communication channels.

Figure 2:
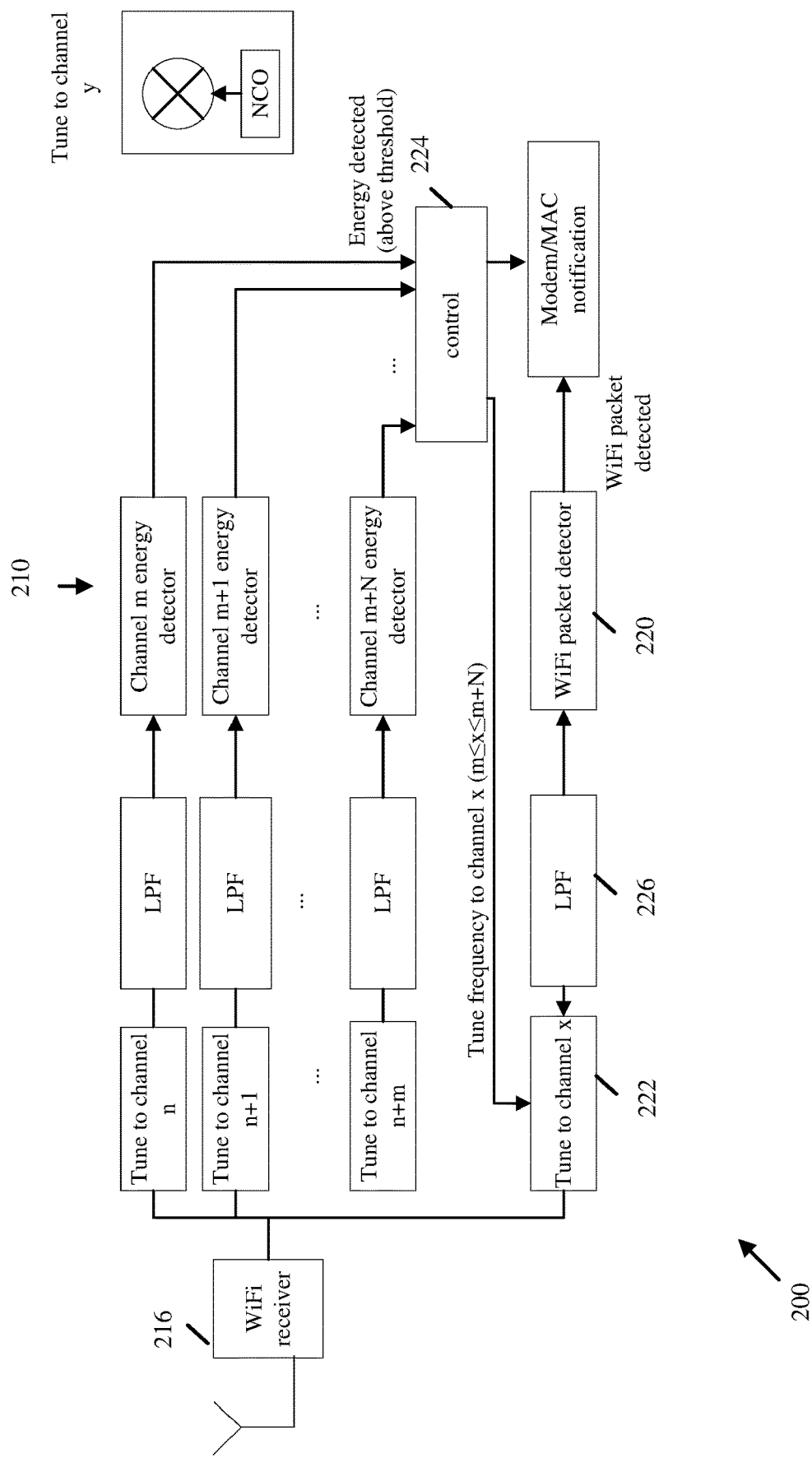
FIG. 2 is a schematic block diagram illustration of a wireless scan architecture, in accordance with some demonstrative embodiments.

Reference is made to FIG. 2, which schematically illustrates a block diagram of a wireless scan architecture 200, in accordance with some demonstrative embodiments.

In one example, device 102 (FIG. 1) may be configured to perform the functionality of, the role of, and/or one or more operations of, wireless scan architecture 200.

In some demonstrative embodiments, wireless scan architecture 200 may include a plurality of N energy detectors 210 corresponding to a respective plurality of N channels; and a packet detector 220, e.g., a WiFi packet detector. For example, the plurality of energy detectors 110 (FIG. 1) may be configured to perform the functionality of, the role of, and/or one or more operations of, the plurality of energy detectors 210; and/or packet detector 120 (FIG. 1) may be configured to perform the functionality of, the role of, and/or one or more operations of, the plurality of packet detector 220.

In some demonstrative embodiments, during a passive scan flow, a receiver 216 may be opened to a maximal BW to include the plurality of N channels, e.g., 8 channels for a STA supporting a 160 MHz bandwidth, for example, by opening an energy detector 210 on every channel of the plurality of N channels, for example, to identify RF energy for that channel.

In some demonstrative embodiments, wireless scan architecture 200 may include a controller 224, which may be configured to tune the packet detector 220 to a particular wireless channel of the plurality of channels, for example, once energy is detected in that particular channel. For example, controller 124 (FIG. 1) may be configured to perform the functionality of, the role of, and/or one or more operations of, controller 224.

In some demonstrative embodiments, as shown in FIG. 2, packet detector 220 may be configured to detect a packet transmission over the particular wireless channel, for example, using a dedicated tuner 222 and a dedicated Low Pass Filter (LPF) 226, and/or any other additional or alternative packet detection components.

In some demonstrative embodiments, the plurality of energy detectors 210 may continue working on the plurality of N channels, for example, while the packet detector 220 attempts to detect a packet on the particular wireless channel.

In some demonstrative embodiments, during the packet detection by the packet detector 220, if energy is detected by energy detectors 210 over another channel, the another channel may be marked as suspect for Wi-Fi energy, for example, to remove a risk of an existing Wi-Fi AP on one of the other channels during the activity time of Wi-Fi packet detector 220.

In some demonstrative embodiments, when a Wi-Fi packet is detected on a wireless channel, e.g., by Wi-Fi packet detector 220, a STA implementing scanning architecture 200 may be configured to decide whether to complete receiving the Wi-Fi packet and to decode it, or to mark that wireless channel for additional passive or active scan, e.g., with a higher confidence level of Wi-Fi activity over that wireless channel, and to continue the energy detection.

In one example, the decision whether to complete receiving the Wi-Fi packet or to mark that wireless channel for additional passive or active scan, may be determined, for example, dynamically, e.g., based on measured indications, or statically, e.g., based on a pre-defined static decision.

Figure 3:
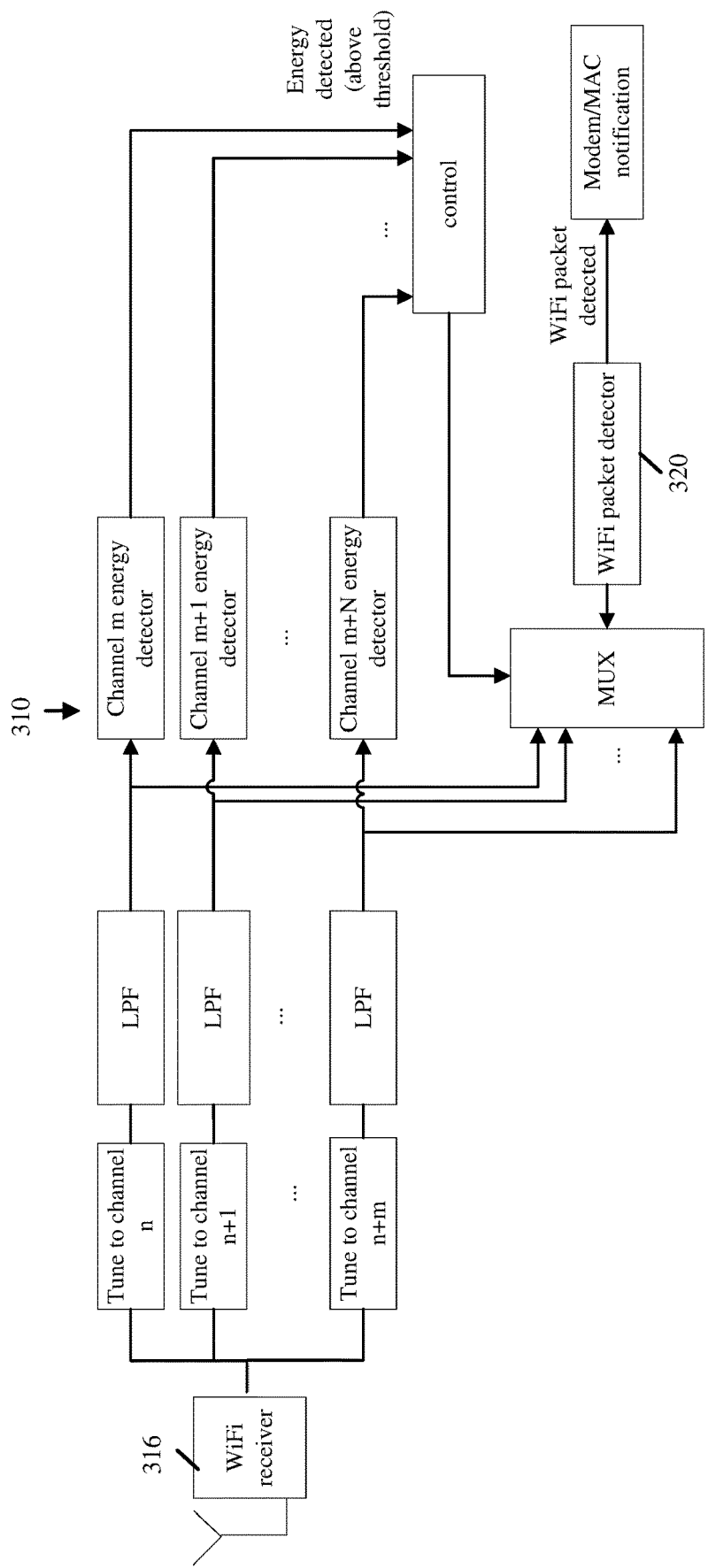
FIG. 3 is a schematic block diagram illustration of a wireless scan architecture, in accordance with some demonstrative embodiments.

Reference is made to FIG. 3, which schematically illustrates a block diagram of a wireless scan architecture 300, in accordance with some demonstrative embodiments.

In one example, device 102 (FIG. 1) may be configured to perform the functionality of, the role of, and/or one or more operations of, wireless scan architecture 300.

In some demonstrative embodiments, wireless scan architecture 300 may include a plurality of N energy detectors 310 corresponding to a respective plurality of N channels, and a packet detector 320, e.g., a WiFi packet detector. For example, the plurality of energy detectors 110 (FIG. 1) may be configured to perform the functionality of, the role of, and/or one or more operations of, the plurality of energy detectors 310; and/or packet detector 120 (FIG. 1) may be configured to perform the functionality of, the role of, and/or one or more operations of, the plurality of packet detector 320.

In some demonstrative embodiments, during a passive scan flow, a receiver 316 may be opened to a maximal BW to include the plurality of N channels, e.g., 8 channels for a STA supporting a 160 MHz bandwidth, for example, by opening an energy detector 310 on every channel of the plurality of N channels, for example, to identify RF energy for that channel.

In some demonstrative embodiments, wireless scan architecture 300 may include a controller 324, which may be configured to tune the packet detector 320 to a particular wireless channel of the received channels, for example, once energy is detected in the particular channel. For example, controller 124 (FIG. 1) may be configured to perform the functionality of, the role of, and/or one or more operations of, controller 324.

In some demonstrative embodiments, as shown in FIG. 3, packet detector 320 may be configured to detect a packet transmission over that particular wireless channel, for example, while relying on a tuner and an LPF used for the energy detection over that particular wireless channel, e.g., without using a dedicated tuner and/or a dedicated LPF.

In some demonstrative embodiments, the plurality of energy detectors 310 may continue working on the plurality of N channels, for example, while the packet detector 320 detects on the particular wireless channel.

In some demonstrative embodiments, during the packet detection of the packet detector 320 over the particular channel, if energy is detected over another channel, the another channel may be marked as suspect for Wi-Fi energy, for example, to remove a risk of an existing Wi-Fi AP on one of the other channels during the activity time of Wi-Fi packet detector 320.

In some demonstrative embodiments, when a Wi-Fi packet is detected on a wireless channel, e.g., by Wi-Fi packet detector 320, a STA implementing scanning architecture 300 may be configured to decide whether to complete receiving the Wi-Fi packet and to decode it, or to mark that wireless channel for additional passive or active scan, e.g., as described above.

Figure 4:
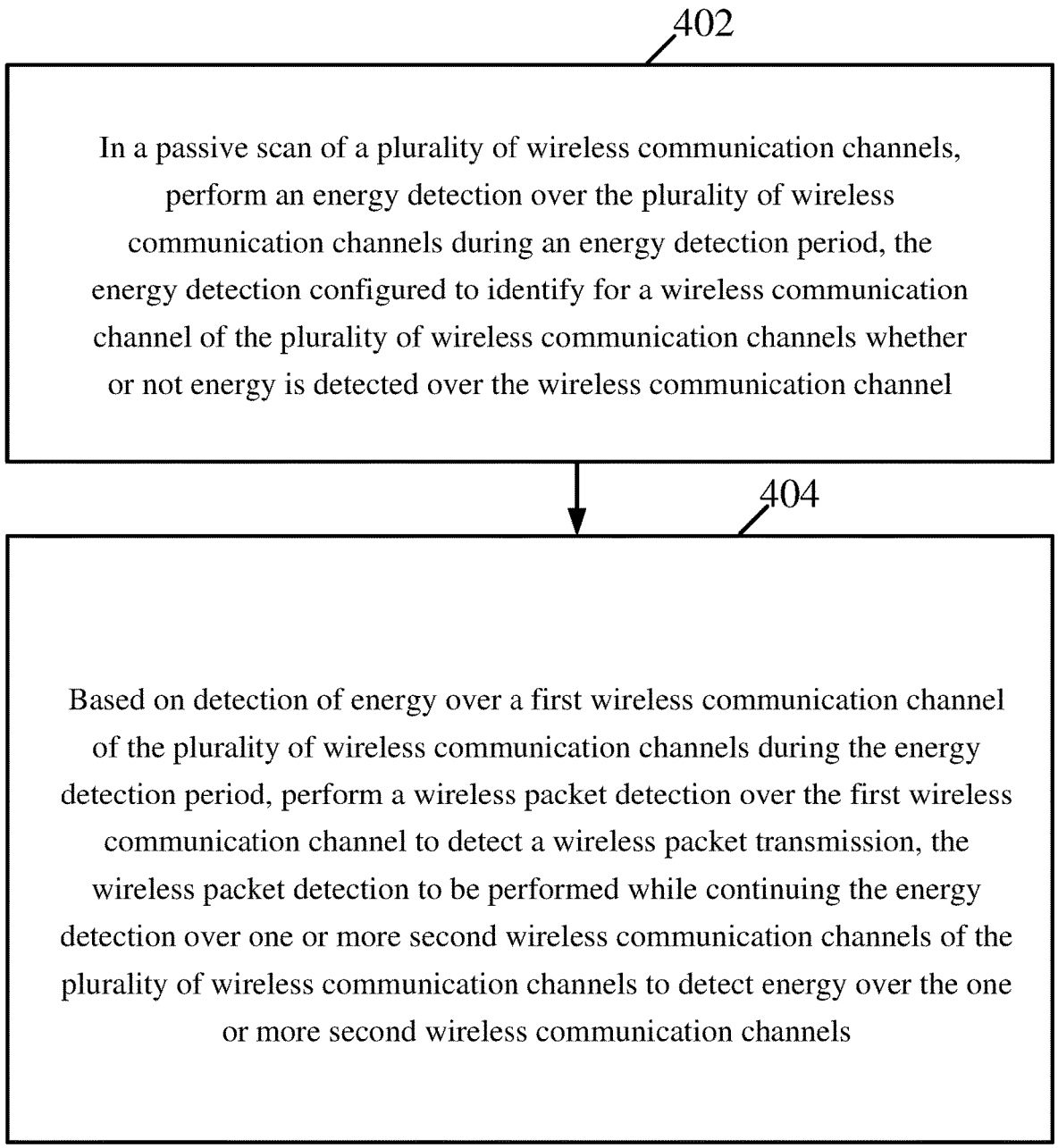
FIG. 4 is a schematic flow-chart illustration of a method of wireless passive scanning, in accordance with some demonstrative embodiments.

Reference is made to FIG. 4, which schematically illustrates a method of wireless passive scanning, in accordance with some demonstrative embodiments. For example, one or more of the operations of the method of FIG. 4 may be performed by a wireless communication system, e.g., system 100 (FIG. 1); a wireless communication device, e.g., device 102 (FIG. 1); a controller, e.g., controller 124 (FIG. 1); a radio, e.g., radio 114 (FIG. 1); a message processor, e.g., message processor 128 (FIG. 1); a receiver, e.g., receiver 116 (FIG. 1); a plurality of energy detectors, e.g., the plurality of energy detectors 110 (FIG. 1); and/or a wireless packet detector, e.g., wireless packet detector 120 (FIG. 1).

As indicated at block 402, the method may include, in a passive scan of a plurality of wireless communication channels, performing an energy detection over the plurality of wireless communication channels during an energy detection period, the energy detection configured to identify for a wireless communication channel of the plurality of wireless communication channels whether or not energy is detected over the wireless communication channel. For example, controller 124 (FIG. 1) may control, cause and/or trigger the STA implemented by device 102 (FIG. 1) to, in a passive scan of a plurality of wireless communication channels, perform the energy detection over the plurality of wireless communication channels during the energy detection period, the energy detection configured to identify for the wireless communication channel of the plurality of wireless communication channels whether or not the energy is detected over the wireless communication channel, e.g., as described above.

As indicated at block 404, the method may include, based on detection of energy over a first wireless communication channel of the plurality of wireless communication channels during the energy detection period, performing a wireless packet detection over the first wireless communication channel to detect a wireless packet transmission, the wireless packet detection to be performed while continuing the energy detection over one or more second wireless communication channels of the plurality of wireless communication channels to detect energy over the one or more second wireless communication channels. For example, controller 124 (FIG. 1) may control, cause and/or trigger the STA implemented by device 102 (FIG. 1) to, based on the detection of the energy over the first wireless communication channel of the plurality of wireless communication channels during the energy detection period, perform the wireless packet detection over the first wireless communication channel to detect the wireless packet transmission, while continuing the energy detection over one or more second wireless communication channels of the plurality of wireless communication channels to detect the energy over the one or more second wireless communication channels, e.g., as described above.

Figure 5:
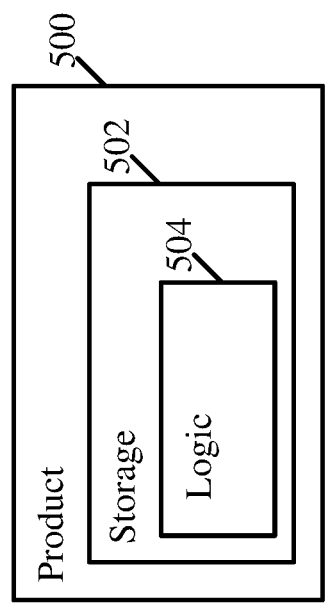
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include one or more tangible computer-readable ("machine readable") non-transitory storage media 502, which may include computer-executable instructions, e.g., implemented by logic 504, operable to, when executed by at least one processor, e.g., computer processor, enable the at least one processor to implement one or more operations at device 102 (FIG. 1), radio 114 (FIG. 1), transmitter 118 (FIG. 1), receiver 116 (FIG. 1), controller 124 (FIG. 1), the plurality of energy detectors 110 (FIG. 1), wireless packet detector 120 (FIG. 1), and/or message processor 128 (FIG. 1), to cause device 102 (FIG. 1), radio 114 (FIG. 1), receiver 116 (FIG. 1), controller 124 (FIG. 1), energy detectors 110 (FIG. 1), wireless packet detector 120 (FIG. 1), and/or message processor 128 (FIG. 1) to perform one or more operations, and/or to perform, trigger and/or implement one or more operations, communications and/or functionalities described above with reference to FIGS. 1, 2, 3 and/or 4, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative embodiments, product 500 and/or storage media 502 may include one or more types of computer-readable storage media capable of storing data, including volatile memory, non-volatile memory, removable or non-removable memory, erasable or non-erasable memory, writeable or re-writeable memory, and the like. For example, storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless communication device to in a passive scan of a plurality of wireless communication channels, perform an energy detection over the plurality of wireless communication channels during an energy detection period, the energy detection configured to identify for a wireless communication channel of the plurality of wireless communication channels whether or not energy is detected over the wireless communication channel;

and based on detection of energy over a first wireless communication channel of the plurality of wireless communication channels during the energy detection period, perform a wireless packet detection over the first wireless communication channel to detect a wireless packet transmission, the wireless packet detection to be performed while continuing the energy detection over one or more second wireless communication channels of the plurality of wireless communication channels to detect energy over the one or more second wireless communication channels.

Example 2 includes the subject matter of Example 1, and optionally, wherein the apparatus is configured to cause the wireless communication device to, based on detection of energy over a second wireless communication channel of the one or more second wireless communication channels during the energy detection period, perform a wireless packet detection over the second wireless communication channel to detect another wireless packet transmission, the wireless packet detection over the second wireless communication channel to be performed while continuing the energy detection over one or more other wireless communication channels of the plurality of wireless communication channels to detect energy over the one or more other wireless communication channels.

Example 3 includes the subject matter of Example 2, and optionally, wherein the detection of energy over the second wireless communication channel is after the wireless packet detection over the first wireless communication channel.

Example 4 includes the subject matter of any one of Examples 1-3, and optionally, wherein the apparatus is configured to cause the wireless communication device to, based on detection of energy over a second wireless communication channel of the one or more second wireless communication channels during the wireless packet detection over the first wireless communication channel, perform a wireless packet detection over the second wireless communication channel to detect another wireless packet transmission during a successive energy detection period after the energy detection period.

Example 5 includes the subject matter of Example 4, and optionally, wherein the apparatus is configured to cause the wireless communication device to determine a time stamp corresponding to a time of detection of the energy over the second wireless communication channel, and to determine, based on the time stamp, a timing of the wireless packet detection over the second wireless communication channel during the successive energy detection period.

Example 6 includes the subject matter of any one of Examples 1-5, and optionally, wherein the apparatus is configured to cause the wireless communication device to determine, based on at least one criterion, whether or not to perform the wireless packet detection over the first wireless communication channel, the at least one criterion is based on one or more attributes of the energy detected over the first wireless communication channel.

Example 7 includes the subject matter of any one of Examples 1-6, and optionally, wherein the apparatus is configured to cause the wireless communication device to determine, based on a duration of the detection of the energy over the first wireless communication channel, whether or not to perform the wireless packet detection over the first wireless communication channel.

Example 8 includes the subject matter of any one of Examples 1-7, and optionally, comprising a plurality of energy detectors, and a controller configured to control the plurality of energy detectors to detect the energy over the plurality of wireless communication channels, the controller configured to control an energy detector of the plurality of energy detectors to detect energy over a respective wireless communication channel of the plurality of wireless communication channels.

Example 9 includes the subject matter of Example 8, and optionally, comprising a wireless packet detector, wherein the controller is configured to control the wireless packet detector to detect the wireless packet transmission over the first wireless communication channel during the energy detection over the plurality of wireless communication channels.

Example 10 includes the subject matter of any one of Examples 1-9, and optionally, wherein the energy detection period is based on a channel dwell time.

Example 11 includes the subject matter of any one of Examples 1-10, and optionally, wherein the wireless packet transmission comprises a beacon frame.

Example 12 includes the subject matter of any one of Examples 1-11, and optionally, wherein the plurality of wireless communication channels comprises at least eight 20 Megahertz (MHz) wireless communication channels.

Example 13 includes the subject matter of any one of Examples 1-12, and optionally, comprising a radio to communicate over the plurality of wireless communication channels.

Example 14 includes the subject matter of Example 13, and optionally, comprising one or more antennas connected to the radio, a memory to store data processed by the wireless communication device, and a processor to execute instructions of an operating system.

Example 15 comprises an apparatus comprising means for executing any of the described operations of Examples 1-14.

Example 16 comprises a machine readable medium that stores instructions for execution by a processor to perform any of the described operations of Examples 1-14.

Example 17 comprises an apparatus comprising: a memory interface; and processing circuitry configured to: perform any of the described operations of Examples 1-14.

Example 18 comprises a method to perform any of the described operations of Examples 1-14.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication device to:
   in a passive scan of a plurality of wireless communication channels, perform an energy detection over the plurality of wireless communication channels during an energy detection period, the energy detection configured to identify for a wireless communication channel of the plurality of wireless communication channels whether or not energy is detected over the wireless communication channel; and
   based on detection of energy over a first wireless communication channel of the plurality of wireless communication channels during the energy detection period, perform a wireless packet detection over the first wireless communication channel to detect a wireless packet transmission, the wireless packet detection to be performed while continuing the energy detection over one or more second wireless communication channels of the plurality of wireless communication channels to detect energy over the one or more second wireless communication channels.

2. The apparatus of claim 1 configured to cause the wireless communication device to, based on detection of energy over a second wireless communication channel of the one or more second wireless communication channels during the energy detection period, perform a wireless packet detection over the second wireless communication channel to detect another wireless packet transmission, the wireless packet detection over the second wireless communication channel to be performed while continuing the energy detection over one or more other wireless communication channels of the plurality of wireless communication channels to detect energy over the one or more other wireless communication channels.

3. The apparatus of claim 2, wherein the detection of energy over the second wireless communication channel is after the wireless packet detection over the first wireless communication channel.

4. The apparatus of claim 1 configured to cause the wireless communication device to, based on detection of energy over a second wireless communication channel of the one or more second wireless communication channels during the wireless packet detection over the first wireless communication channel, perform a wireless packet detection over the second wireless communication channel to detect another wireless packet transmission during a successive energy detection period after the energy detection period.

5. The apparatus of claim 4 configured to cause the wireless communication device to determine a time stamp corresponding to a time of detection of the energy over the second wireless communication channel, and to determine, based on the time stamp, a timing of the wireless packet detection over the second wireless communication channel during the successive energy detection period.

6. The apparatus of claim 1 configured to cause the wireless communication device to determine, based on at least one criterion, whether or not to perform the wireless packet detection over the first wireless communication channel, the at least one criterion is based on one or more attributes of the energy detected over the first wireless communication channel.

7. The apparatus of claim 1 configured to cause the wireless communication device to determine, based on a duration of the detection of the energy over the first wireless communication channel, whether or not to perform the wireless packet detection over the first wireless communication channel.

8. The apparatus of claim 1 comprising a plurality of energy detectors, and a controller configured to control the plurality of energy detectors to detect the energy over the plurality of wireless communication channels, the controller configured to control an energy detector of the plurality of energy detectors to detect energy over a respective wireless communication channel of the plurality of wireless communication channels.

9. The apparatus of claim 8 comprising a wireless packet detector, wherein the controller is configured to control the wireless packet detector to detect the wireless packet transmission over the first wireless communication channel during the energy detection over the plurality of wireless communication channels.

10. The apparatus of claim 1, wherein the energy detection period is based on a channel dwell time.

11. The apparatus of claim 1, wherein the wireless packet transmission comprises a beacon frame.

12. The apparatus of claim 1, wherein the plurality of wireless communication channels comprises at least eight 20 Megahertz (MHz) wireless communication channels.

13. The apparatus of claim 1 comprising a radio to communicate over the plurality of wireless communication channels.

14. The apparatus of claim 13 comprising one or more antennas connected to the radio, a memory to store data processed by the wireless communication device, and a processor to execute instructions of an operating system.

15. A product comprising one or more tangible computer-readable non-transitory storage media comprising computer-executable instructions operable to, when executed by at least one processor, enable the at least one processor to cause a wireless communication device to:

in a passive scan of a plurality of wireless communication channels, perform an energy detection over the plurality of wireless communication channels during an energy detection period, the energy detection configured to identify for a wireless communication channel of the plurality of wireless communication channels whether or not energy is detected over the wireless communication channel; and based on detection of energy over a first wireless communication channel of the plurality of wireless communication channels during the energy detection period, perform a wireless packet detection over the first wireless communication channel to detect a wireless packet transmission, the wireless packet detection to be performed while continuing the energy detection over one or more second wireless communication channels of the plurality of wireless communication channels to detect energy over the one or more second wireless communication channels.

16. The product of claim 15, wherein the instructions, when executed, cause the wireless communication device to, based on detection of energy over a second wireless communication channel of the one or more second wireless communication channels during the energy detection period, perform a wireless packet detection over the second wireless communication channel to detect another wireless packet transmission, the wireless packet detection over the second wireless communication channel to be performed while continuing the energy detection over one or more other wireless communication channels of the plurality of wireless communication channels to detect energy over the one or more other wireless communication channels.

17. The product of claim 16, wherein the detection of energy over the second wireless communication channel is after the wireless packet detection over the first wireless communication channel.

18. The product of claim 15, wherein the instructions, when executed, cause the wireless communication device to, based on detection of energy over a second wireless communication channel of the one or more second wireless communication channels during the wireless packet detection over the first wireless communication channel, perform a wireless packet detection over the second wireless communication channel to detect another wireless packet transmission during a successive energy detection period after the energy detection period.

19. The product of claim 18, wherein the instructions, when executed, cause the wireless communication device to determine a time stamp corresponding to a time of detection of the energy over the second wireless communication channel, and to determine, based on the time stamp, a timing of the wireless packet detection over the second wireless communication channel during the successive energy detection period.

20. The product of claim 15, wherein the instructions, when executed, cause the wireless communication device to determine, based on at least one criterion, whether or not to perform the wireless packet detection over the first wireless communication channel, the at least one criterion is based on one or more attributes of the energy detected over the first wireless communication channel.

21. The product of claim 15, wherein the instructions, when executed, cause the wireless communication device to determine, based on a duration of the detection of the energy over the first wireless communication channel, whether or not to perform the wireless packet detection over the first wireless communication channel.

22. The product of claim 15, wherein the energy detection period is based on a channel dwell time.

23. An apparatus of a wireless communication device, the apparatus comprising:
  means for, in a passive scan of a plurality of wireless communication channels, performing an energy detection over the plurality of wireless communication channels during an energy detection period, the energy detection configured to identify for a wireless communication channel of the plurality of wireless communication channels whether or not energy is detected over the wireless communication channel; and
  means for, based on detection of energy over a first wireless communication channel of the plurality of wireless communication channels during the energy detection period, performing a wireless packet detection over the first wireless communication channel to detect a wireless packet transmission, the wireless packet detection to be performed while continuing the energy detection over one or more second wireless communication channels of the plurality of wireless communication channels to detect energy over the one or more second wireless communication channels.

24. The apparatus of claim 23 comprising means for, based on detection of energy over a second wireless communication channel of the one or more second wireless communication channels during the energy detection period, performing a wireless packet detection over the second wireless communication channel to detect another wireless packet transmission, the wireless packet detection over the second wireless communication channel to be performed while continuing the energy detection over one or more other wireless communication channels of the plurality of wireless communication channels to detect energy over the one or more other wireless communication channels.

25. The apparatus of claim 23 comprising means for, based on detection of energy over a second wireless communication channel of the one or more second wireless communication channels during the wireless packet detection over the first wireless communication channel, performing a wireless packet detection over the second wireless communication channel to detect another wireless packet transmission during a successive energy detection period after the energy detection period.

* * * * *